United States Patent [19]

Fujita et al.

[11] Patent Number: 5,486,572
[45] Date of Patent: Jan. 23, 1996

[54] PROCESS FOR PREPARING PROPYLENE BLOCK COPOLYMERS

[75] Inventors: Takashi Fujita; Toshihiko Sugano, both of Yokkaichi, Japan

[73] Assignee: Mitsubishi Chemical Corporation, Tokyo, Japan

[21] Appl. No.: 352,199

[22] Filed: Dec. 1, 1994

Related U.S. Application Data

[63] Continuation of Ser. No. 185,233, Jan. 24, 1994, abandoned, which is a continuation of Ser. No. 12,984, Feb. 3, 1993, abandoned, which is a continuation of Ser. No. 727,124, Jul. 9, 1991, abandoned.

[30] Foreign Application Priority Data

Sep. 27, 1990 [JP] Japan .................................... 2-258381

[51] Int. Cl.$^6$ ................................... C08F 297/08
[52] U.S. Cl. .................. 525/247; 525/268; 525/270; 525/288; 525/308; 525/312; 525/323
[58] Field of Search .................... 525/247, 268, 525/270, 288, 308, 312, 323

[56] References Cited

U.S. PATENT DOCUMENTS

| | | | |
|---|---|---|---|
| 4,259,461 | 3/1981 | Shiga et al. | 525/247 |
| 4,547,552 | 10/1985 | Toyota et al. | 525/247 |
| 4,808,667 | 2/1989 | Goko et al. | 525/270 |
| 5,081,190 | 1/1992 | Asanuma et al. | 525/288 |
| 5,225,501 | 7/1993 | Fujita et al. | 526/127 |
| 5,331,054 | 7/1994 | Fujita et al. | 525/240 |

FOREIGN PATENT DOCUMENTS

| | | | |
|---|---|---|---|
| 0254234 | 1/1988 | European Pat. Off. | |
| 0331364 | 9/1989 | European Pat. Off. | |
| 0357394 | 3/1990 | European Pat. Off. | 525/247 |

OTHER PUBLICATIONS

WPIL, AN 89–029601 & JP–A–63–305115, Dec. 13, 1988.

*Primary Examiner*—Romulo H. Delmendo
*Attorney, Agent, or Firm*—Oblon, Spivak, McClelland, Maier, & Neustadt

[57] ABSTRACT

A process for preparing propylene block copolymers, comprising a preceding polymerization step in which a crystalline homopolymer of propylene, or a propylene-ethylene copolymer containing 7 wt. % or less of ethylene is produced in the presence of a catalyst comprising the following components (A) and (B), and a succeeding polymerization step in which the polymerization is continued in the presence of at least part of the homopolymer or copolymer, and of the following component (C) further added to give a copolymer with a polymerization ratio (weight ratio) of propylene to ethylene of from 0/100 to 90/10; the polymerization amount at the preceding polymerization step being from 30 to 95 wt. % of the total polymerization amount at the preceding and succeeding polymerization steps;

component (A): a solid catalyst component of Ziegler catalysts comprising as essential components titanium, magnesium and a halogen;

component (B): an organoaluminum compound; and component (C): an internal olefin having 3 to 20 carbon atoms, or an olefinic compound having 2 to 20 carbon atoms which contains a polar group at its d-position.

The process can solve the problem of stickiness imparted to the copolymer due to the existence of a rubber-like copolymer, which has been the conventional problem caused upon preparing a crystalline propylene polymer block and a rubber-like propylene-ethylene copolymer block by a two-step polymerization process.

27 Claims, No Drawings

PROCESS FOR PREPARING PROPYLENE BLOCK COPOLYMERS

This application is a Continuation of application Ser. No. 08/185,233, filed on Jan. 24, 1994, now abandoned, which was a Continuation of application Ser. No. 08/012,984, filed Feb. 3, 1993, now abandoned, which was a Continuation of application Ser. No. 07/727,124, filed Jul. 9, 1991, now abandoned.

BACKGROUND OF THE INVENTION

1. Field of the Art

This invention relates to a polymerization process for preparing, with high activity, high efficiency and high stability, propylene block copolymers having high rigidity and high impact resistance.

2. Related Art

Crystalline polypropylene has the advantageous properties of high rigidity and high resistance for heat, but has the shortcoming of low impact resistance which is particularly remarkable at low temperatures.

There has already been known a method for improving the above point, in which propylene, and ethylene or other olefin are polymerized by stages to give a block copolymer, as disclosed in Japanese Patent Publications No. 43-11230, No. 44-16668, No. 44-20621, No. 49-24593 and No. 49-30264, Japanese Laid-Open Patent Applications No. 48-25781, No. 50-115296, No. 53-35789 and No. 54-110072, and the like.

However, in the case where propylene and ethylene are polymerized in two stages or multiple stages, although the resulting polymer will have improved impact resistance, a large amount of low crystalline polymers are by-produced since the polymerization product contains copolymeric moieties.

In general, to improve the impact resistance of a block copolymer, the production rate of a rubber-like copolymer is increased. In this case, however, the amount of the by-product is increased, the polymer particles adhere to one another, and the polymer adheres to an inner wall of an apparatus which is used for the preparation of the polymer. As a result, it often becomes difficult to stably and continuously operate the apparatus over a long period of time.

Furthermore, the obtained polymer has the problems of a narrow molecular weight distribution, and of impaired formability or moldability upon forming or molding. In order to improve the above, there has been known a method in which a specific electron donor is added at the preceding polymerization stage or succeeding polymerization stage, as disclosed in Japanese Laid-Open Patent Applications No. 56-151713, No. 60-59139, No. 61-69821, No. 61-69822, No. 61-69823 and No. 63-43915. These techniques can contribute to, to some degree, a decrease in the production rate of by-product, and an improvement in the workability of the polymer produced. However, they have the problems of a decrease in the activity, and of an increase in the production cost because a large amount of additives have to be employed. On the other hand, the molecular weight of the rubber-like polymer becomes inevitably high when these techniques are applied. As a result, the workability of the polymer upon molding is improved, for instance, the formation of a flow mark is eliminated, but the coating property, adhesion property and the like may be impaired.

As other technique of adding an additive at the succeeding polymerization stage, there has been known a technique of employing alkyllithium or alkylmagnesium, as disclosed in Japanese Laid-Open Patent Applications No. 62-132912, No. 62-135509 and No. 2-117905. However, when an excessive amount of the additive is employed, it strongly acts as a catalytic poison, so that the polymerization activity of propylene is lost. For this reason, there is expected the development of a technique which can restrain the formation of a sticky or heptane-soluble product without affecting the molecular weight.

SUMMARY OF THE INVENTION

The inventors of the present invention have made earnest studies to solve the above-described problems, and have found that the problems can be solved by using a specific olefinic compound. The present invention has been accomplished on the basis of the above finding.

Accordingly, the process for preparing propylene block copolymers according to the present invention comprises a preceding polymerization step in which a crystalline homopolymer of propylene, or a propylene-ethylene copolymer containing 7 wt. % or less of ethylene copolymerized is produced in the presence of a catalyst comprising the following components (A) and (B), and a succeeding polymerization step in which the polymerization is continued in the presence of at least part of the homopolymer or copolymer of the preceding polymerization step, and of the following component (C) further added to give a copolymer with a polymerization ratio in a weight ratio of propylene to ethylene of from 0/100 to 90/10, preferably from 0/100 to 80/20, the polymerization amount at the preceding polymerization step being from 30 to 95 wt. % of the total polymerization amount at the preceding and succeeding polymerization steps:

- component (A): a solid catalyst component of Ziegler catalysts comprising as essential components titanium, magnesium and a halogen;
- component (B): an organoaluminum compound; and
- component (C): an internal olefin having 3 to 20 carbon atoms, or an olefinic compound having 2 to 20 carbon atoms containing a polar group at its α-position.

By the process for preparing propylene block copolymers according to the present invention, a propylene block copolymer having high rigidity, high impact resistance and high moldability can be obtained, by employing a highly active carried catalyst, with the formation of a less amount of by-product.

Furthermore, according to the present invention, even when the amount of a rubber-like copolymer is large, for instance, 30 wt. % or more, particles of the polymer obtained are less sticky, and the conventional trouble which is caused upon operating an apparatus used for the polymerization can thus be solved.

DETAILED DESCRIPTION OF THE INVENTION

[Catalyst]

The catalyst of the present invention comprises specific components (A) and (B), and finally component (C). The term "comprise" herein means that the components of the catalyst are not limited only to the above-enumerated ones, that is, the components (A), (B) and (C), and does not exclude the co-existence of other components fitting for the purposes of the invention so long as they do not impair the addition effect of the component (C).

Component (A)

The component (A) is a solid component of Ziegler catalysts comprising as essential components titanium, magnesium and a halogen. The words "comprising as essential components" herein indicate that the component (A) can contain, other than the above-enumerated three components, other elements which fit for the purposes of the invention, that these elements can respectively exist in the form of any compound which fits for the purposes of the invention, and that these elements can exist as the state of being bonded with one another. As such a solid component, known ones can be employed. For instance, those solid components which are described in the following official gazettes are used: Japanese Laid-Open Patent Applications No. 53-45688, No. 54-3894, No. 54-31092, No. 54-39483, No. 54-94591, No. 54-118484, No. 54-131589, No. 55-75411, No. 55-90510, No. 55-90511, No. 55-127405, No. 55-147507, No. 55-155003, No. 56-18609, No. 56-70005, No. 56-72001, No. 56-86905, No. 56-90807, No. 56-155206, No. 57-3803, No. 57-34103, No. 57-92007, No. 57-121003, No. 58-5309 No. 58-5310, No. 58-5311, No. 58-8706, No. 58-27732, No. 58-32604, No. 58-32605, No. 58-67703, No. 58-117206, No. 58-127708, No. 58-183708, No. 58-183709, No. 59-149905, No. 59-149906, No. 60-130607, No. 61-55104, No. 61-204204, No. 62-508, No. 62-15209, No. 62-20507, No. 62-184005, No. 62-236805, No. 63-113004, No. 63-199207, No. 1-139601 and No. 1-215806, and the like.

As magnesium compounds which serve as the source of magnesium for use in the present invention, magnesium halides, dialkoxymagnesium, alkoxymagnesium halides, magnesium oxyhalides, dialkylmagnesiums, magnesium oxide, magnesium hydroxide, carboxylic acid salts of magnesium, and the like can be mentioned. Of these magnesium compounds, magnesium halides are preferred.

As titanium compounds which serve as the source of titanium, those compounds represented by the formula $Ti(OR^1)_{4-n}X_n$, in which $R^1$ is a hydrocarbyl group, preferably a hydrocarbyl group having approximately 1 to 10 carbon atoms, X represents a halogen, and n represents a number in the range of $0 \leq n \leq 4$, can be mentioned. As specific examples of the compounds, $TiCl_4$,
$TiBr_4$,
$Ti(OC_2H_5)Cl_3$,
$Ti(OC_2H_5)_2Cl_2$,
$Ti(OC_2H_5)_3Cl$,
$Ti(O-iC_3H_7)Cl_3$,
$Ti(O-nC_4H_9)Cl_3$,
$Ti(O-nC_4H_9)_2Cl_2$,
$Ti(OC_2H_5)Br_3$,
$Ti(OC_2H_5)(OC_4H_9)_2Cl$,
$Ti(O-nC_4H_9)_3Cl$,
$Ti(O-C_6H_5)Cl_3$,
$Ti(O-iC_4H_9)_2Cl_2$,
$Ti(OC_5H_{11})Cl_3$,
$Ti(OC_6H_{13})Cl_3$,
$Ti(OC_2H_5)_4$,
$Ti(O-nC_3H_7)_4$,
$Ti(O-nC_4H_9)_4$,
$Ti(O-iC_4H_9)_4$,
$Ti(O-nC_6H_{13})_4$,
$Ti(O-nC_8H_{17})_4$,
$Ti[OCH_2CH(C_2H_5)C_4H_9]_4$,
and the like can be mentioned.

Furthermore, a molecular compound prepared by reacting $TiX'_4$, in which X' represents a halogen, with an electron donor which will be described later can also be employed. As specific examples of the molecular compound, $TiCl_4 \cdot CH_3COC_2H_5$,
$TiCl_4 \cdot CH_3CO_2C_2H_5$,
$TiCl_4 \cdot C_6H_5NO_2$,
$TiCl_4 \cdot CH_3COCl$,
$TiCl_4 \cdot C_6H_5COCl$,
$TiCl_4 \cdot C_6H_5CO_2C_2H_5$,
$TiCl_4 \cdot ClCOC_2H_5$,
$TiCl_4 \cdot C_4H_4O$,
and the like can be mentioned.

Of these titanium compounds, preferable ones are $TiCl_4$, $Ti(OC_2H_5)_4$, $Ti(OC_4H_9)_4$, $Ti(OC_4H_9)Cl_3$, and the like.

Halogen is generally supplied by the above-described halogenated compounds of magnesium and/or titanium. However, it can also be supplied by known halogenating agents such as a halogenated compound of aluminum, a halogenated compound of silicon and a halogenated compound of phosphorus.

The halogen contained in the catalytic component may be fluorine, chlorine, bromine, iodine, or a mixture thereof, and chlorine is particularly preferable.

It is acceptable that the solid component for use in the present invention comprises, other than the above-described essential components, other components such as silicon compounds such as $SiCl_4$, $CH_3SiCl_3$, etc., polymeric silicon compounds such as methylhydrogenpolysiloxane, etc., aluminum compounds such as $Al(O-iC_3H_7)_3$, $AlCl_3$, $AlBr_3$, $Al(OC_2H_5)_3$, $Al(OCH_3)_2Cl$, etc., boron compounds such as $B(OCH_3)_3$, $B(OC_2H_5)_3$, $B(OC_6H_5)_3$, etc., and the like. Also, these compounds can remain in the solid components as the components of silicon, aluminum, boron, and the like.

Further, when preparing this solid component, an electron donor is also employable as an internal donor.

As the electron donor (internal donor) usable for the preparation of the solid component, electron donors containing oxygen such as alcohols, phenols, ketones, aldehydes, carboxylic acids, esters of organic or inorganic acids, ethers, acid amides and acid anhydrides, and electron donors containing nitrogen such as ammonia, amines, nitriles and isocyanates can be mentioned.

More specifically, (a) alcohols having 1 to 18 carbon atoms such as methanol, ethanol, propanol, pentanol, hexanol, octanol, dodecanol, octadecyl alcohol, benzyl alcohol, phenylethyl alcohol, cumenyl alcohol and isopropylbenzyl alcohol, (b) phenols having 6 to 25 carbon atoms, which may have an alkyl group, such as phenol, cresol, xylenol, ethylphenol, propylphenol, isopropylphenol, nonylphenol and naphthol, (c) ketones having 3 to 15 carbon atoms such as acetone, methyl ethyl ketone, methyl isobutyl ketone, acetophenone and benzophenone, (d) aldehydes having 2 to 15 carbon atoms such as acetaldehyde, propionaldehyde, octylaldehyde, benzaldehyde, tolualdehyde and naphthaldehyde, (e) esters of an organic acid having 2 to 20 carbon atoms such as methyl formate, methyl acetate, ethyl acetate, vinyl acetate, ethylcellosolve acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexane carboxylate, methyl benzoate, ethyl benzoate, ethylcellosolve benzoate, propyl benzoate, butyl benzoate, octyl benzoate, cyclohexyl benzoate, phenyl benzoate, benzyl benzoate, methyl toluate, ethyl toluate, amyl toluate, ethylethylbenzoate, methyl anisate, ethyl anisate, ethylethoxybenzoate, diethyl phthalate, dibutyl phthalate, diheptyl phthalate, γ-butyrolactone, α-valerolactone, coumarine, phthalide and ethylene carbonate, (f) esters of an inorganic acid such as esters of silicic acid, for instance, ethyl silicate, butyl silicate, phenyltriethoxysilane, diphenyldimethoxysilane and tert-butylmethyldimethoxysilane, (g) acid halides having 2 to 15 carbon atoms such as acetyl chloride, benzoyl chloride, toluic acid chloride, anisic acid chloride, phthaloyl chloride and isophthaloyl chloride, (h) ethers having 2 to 20 carbon atoms such as methyl ether, ethyl ether, isopropyl ether, butyl ether, amyl ether, tetrahydrofuran, anisole and diphenyl ether, (i) acid amides such as acetic acid amide, benzoic acid amide and toluic acid amide, (j) amines such as methylamine, ethylamine, diethylamine, tributylamine, piperidine, tribenzylamine, aniline, pyridine, picoline and tetramethylethylenediamine, (k) nitriles such as acetonitrile, benzonitrile and trinitrile, and the like can be mentioned. Two or more types of these electron donors can be employed in combination. Of these, preferred electron donors are esters of an organic acid, acid halides, and esters of an inorganic acid, and particularly preferred ones are ethylcellosolve acetate, dialkyl phthalate, phthalic acid halide, and organoalkoxysilicon.

The above respective components can be employed in any amount as long as the effects of the present invention can be obtained. However, in general, it is preferably in the following respective ranges.

The amount of the titanium compound is such that the molar ratio of the titanium compound to the magnesium compound employed is in the range of from $1 \times 10^{-4}$ to 1000, preferably from 0.01 to 10. In the case where a compound as the source of halogen is used, the amount of the compound is such that the molar ratio of the compound to the magnesium employed is in the range of from $1 \times 10^{-2}$ to 1000, preferably from 0.1 to 100, irrespective as to whether the titanium compound and/or the magnesium compound contains halogen or not.

The amount of the silicon, aluminum, or boron compound is such that the molar ratio of the compound to the above magnesium compound employed is in the range of from $1 \times 10^{-3}$ to 100, preferably from 0.01 to 1.

The amount of the electron donor compound is such that the molar ratio of the compound to the above magnesium compound employed is in the range of from $1 \times 10^{-3}$ to 10, preferably from 0.01 to 5.

The component (A) may be prepared by using the above-described titanium source, magnesium source, halogen source, and, if necessary, other components such as the electron donor by, for instance, one of the following preparation methods:

(a) A method in which halogenated magnesium and, if necessary, an electron donor are brought into contact with a titanium-containing compound.

(b) A method in which halogenated magnesium, an electron donor and a titanium-halogen-containing compound are brought into contact with alumina or magnesia which has been treated with a halogenated phosphorus compound.

(c) A method in which a halogenated titanium compound and/or a halogenated compound of silicon and, if necessary, an electron donor are brought into contact with a solid component which is obtained by contacting halogenated magnesium with titanium tetraalkoxide and a specific polymeric silicon compound.

As the polymeric silicon compound, compounds represented by the following formula are suitable:

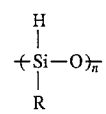

wherein R is a hydrocarbyl group having approximately 1 to 10 carbon atoms, and n represents such a polymerization degree that the polymeric silicon compound has a viscosity of approximately 1 to 100 centistokes.

Of these, methylhydrogenpolysiloxane, 1,3,5,7-tetramethylcyclotetrasiloxane, 1,3,5,7,9-pentamethylcyclopentacycloxane, ethylhydrogenpolysiloxane, phenylhydrogenpolysiloxane, cyclohexylhydrogenpolysiloxane, and the like are preferred.

(d) A method in which a titanium compound is brought into contact with a solid component which is separated, by using a halogenating agent or titanium halogen compound, from a solution prepared by dissolving a magnesium compound in titanium tetraalkoxide and an electron donor.

(e) A method in which an organomagnesium compound such as a Grignard reagent is reacted with a halogenating agent, a reducing agent or the like, and then, if necessary, an electron donor and a titanium compound are brought into contact therewith.

(f) A method in which a halogenating agent and/or titanium compound is brought into contact with an alkoxymagnesium compound in the presence or absence of an electron donor.

Of these, the methods (c), (d) and (e) are preferred, and the method (c) is particularly preferred.

Thus, the solid component (A) comprising as essential components titanium, magnesium and a halogen can be obtained.

Component (B)

The component (B) is an organoaluminum compound.

As specific examples of the compound, compounds represented by the formulae $R^2_{3-n}AlX_n$ and $R^3_{3-m}Al(OR^4)_m$ are mentioned, wherein $R^2$ and $R^3$, which may be the same or different, are hydrocarbyl groups each having approximately 1 to 20 carbon atoms or a hydrogen atom, $R^4$ is a hydrocarbyl group, X is a halogen, and n and m are numbers in the ranges of $0 \leq n < 3$ and $0 < m < 3$, respectively. Specifically, (a) trialkylaluminums such as trimethylaluminum, triethylaluminum, triisobutylaluminum, trihexylaluminum, trioctylaluminum and tridecylaluminum, (b) alkylaluminum halides such as diethylaluminum monochloride, diisobutylaluminum monochloride, ethylaluminum sesquichloride and ethylaluminum dichloride, (c) diethylaluminum hydride and diisobutylaluminum hydride, (d) aluminum alkoxides such as diethylaluminum ethoxide and diethylaluminum phenoxide, and the like can be mentioned.

In addition to these organoaluminum compounds of (a) to (d), other organometal compounds, for instance, alkylaluminum alkoxides represented by the formula $R^5_{3-a}Al(OR^6)_a$, in which a is a number in the range of $1 \leq a \leq 3$, and $R^5$ and $R^6$, which may be the same or different, are hydrocarbyl groups each having approximately 1 to 20 carbon atoms, can be used in combination. For example, the combination use of triethylaluminum and diethylaluminum ethoxide, the combination use of diethylaluminum monochloride and diethylaluminum ethoxide, the combination use of ethylaluminum dichloride and ethylaluminum diethoxide, and the combination use of triethylaluminum, diethylaluminum ethoxide and diethylaluminum chloride can be mentioned.

The amount of the component (B) is such that the weight ratio of the component (B) to the component (A) is from 0.1 to 1000, preferably from 1 to 100.

Component (C)

The component (C) for use in the present invention is an olefinic compound containing an internal olefinical unsaturation or a polar group at its α-position. In general, these are olefin components which exhibit extremely low polymerization ability or are not polymerized at all in the presence of the Ziegler catalyst comprising the components (A) and (B) for use in the present invention. Specific examples such olefin compounds include (1) internal olefins having approximately 3 to 20, preferably 5 to 12, carbon atoms, for instance, (a) cyclic olefins such as cyclopentene, cyclohexene, cyclooctene, dicyclopentadiene, norbornene and ethylidenenorbornene, (b) non-α-olefins such as 2-methyl- 2-butene, 2-hexene and 2,4-hexadiene; and (2) olefinic compounds having 2 to 20, preferably 2 to 12, carbon atoms, containing a polar group such as a halogen atom, a silicon atom, an oxygen atom, a carbonyl group, a carboxyl group etc. at the α-position, for instance, (c) vinyl chloride and vinyl bromide, (d) vinylsilane compounds such as vinylsilane, vinyldimethylsilane, vinyldimethylchlorosilane, vinyltrimethylsilane, vinyldimethylsiloxane and vinylmethylcyclotetrasiloxane, (e) vinyl lower alkyl ethers such as vinylbutyl ether, vinylphenyl ether, vinylcyclohexyl ether and vinyl benzoate, (f) lower alkyl (meth)acrylates such as ethyl acrylate, butyl acrylate and ethyl methacrylate, and the like are mentioned. Of these, preferred ones are cyclic olefins such as norbornene and cyclopentene, vinylsilane compounds such as vinyl tri- lower alkyl (such as methyl) silane and vinyl di- lower alkyl (such as methyl) halo- (such as chloro) silane, and vinyl lower alkyl ethers such as vinyl lower alkyl (such as butyl) ether. More preferable ones are vinylsilane compounds with the remaining valences of the silicon atom (i.e. those not satisfied with a vinyl group) satisfied with a lower alkyl and/or a lower alkoxy group such as vinyltrimethylsilane, vinyl lower alkyl ethers, and the like.

The component (C) can be used in any amount as long as the effect can be obtained. However, in general, the amount of the component (C) is such that the molar ratio of the component (C) to the titanium contained in the component (A) is from 0.01 to 1000, preferably from 0.1 to 500, more preferably 0.2 to 100, and still more preferably from 0.5 to 100. It is noted that the optimum range of the amount used varies depending upon the polymerization process to be adopted. In the case of slurry polymerization, the optimum range tends to be in small values as compared with vapor phase polymerization. When a large amount of the component (C) is employed, the production rate of the by-product can be reduced, and the final polymer can be obtained as fine powder; however, the production cost is increased, and the polymerization activity at the succeeding polymerization step may also be reduced.

Optional Component (D)

In the case where a satisfactorily crystalline homopolymer or copolymer of propylene is not obtained at the preceding polymerization step in which the component (A) and the component (B) are used in combination, an electron donor compound can be employed in the polymerization as an optional component. As specific examples of such a component, esters, ethers, amines, organosilicon compounds, esters of an inorganic acid, and the like are mentioned. Specific examples include aromatic carboxylates such as methylbenzoate, ethylbenzoate and p-ethyltoluylate; ethers such as eucalyptol and diphenyldimethoxymethane; amines such as 2,2,6,6-tetramethylpiperidine and tetramethylethylenediamine, in particular, hindered amines and tertiary amines; silicon compounds represented by the formula $R^1_m X_n Si(OR^2)_{4-m-n}$, in which $R^1$ and $R^2$ are hydrocarbyl groups each having approximately 1 to 20, preferably 1 to 10, carbon atoms, X is a halogen, preferably chlorine, and m and n are numbers which are in the ranges of $0 \leq m \leq 3$ and $0 \leq n \leq 3$, respectively, and, at the same time, fulfill the relation of $0 \leq m+n \leq 3$, preferably a silicon compound of the formula where $R^1$ is a branched hydrocarbyl group having 3 to 20, preferably 3 to 10, carbon atoms, containing a secondary or tertiary carbon atom at its α-position, in particular, a silicon compound of the formula where $R^1$ is a branched hydrocarbyl group having 4 to 10 carbon atoms, containing a tertiary carbon atom at its α-position, such as, for instance:

$(CH_3)Si(OCH_3)_3$,
$(CH_3)Si(OC_2H_5)_3$,
$(C_2H_5)_2Si(OCH_3)_2$,
$(n-C_6H_{11})Si(OCH_3)_3$,
$(C_2H_5)Si(OC_2H_5)_3$,
$(n-C_{10}H_{21})Si(OC_2H_5)_3$,
$(CH_2=CH)Si(OCH_3)_3$,
$Cl(CH_2)_3Si(OCH_3)_3$,
$Si(OCH_3)_4$,
$Si(OC_2H_5)_3Cl$,
$(C_2H_5)_2Si(OC_2H_5)_2$,
$(isoC_3H_7)_2Si(OCH_3)_2$,
$(C_{17}H_{35})Si(OCH_3)_3$,
$Si(OC_2H_5)_4$,
$(C_6H_5)Si(OCH_3)_3$,
$Si(OCH_3)_2Cl_2$,
$(C_6H_5)_2Si(OCH_3)_2$,
$(C_6H_5)(CH_3)Si(OCH_3)_2$,
$(C_6H_5)Si(OC_2H_5)_3$,
$(C_6H_5)_2Si(OC_2H_5)_2$,
$NC(CH_2)_2Si(OC_2H_5)_3$,
$(C_6H_5)(CH_3)Si(OC_2H_5)_2$,
$(n-C_3H_7)Si(OC_2H_5)_3$
$(CH_3)Si(OC_3H_7)_3$,
$(C_6H_5)(CH_2)Si(OC_2H_5)_3$,
$(tertC_4H_9)(CH_3)Si(OCH_3)_2$,
$(tertC_4H_9)_2Si(OCH_3)_2$,
$(C_6H_{11})(CH_3)Si(OCH_3)_2$,
$(C_6H_{11})Si(OCH_3)_2$,
$(C_6H_{11})(CH_3)Si(OCH_3)_2$,

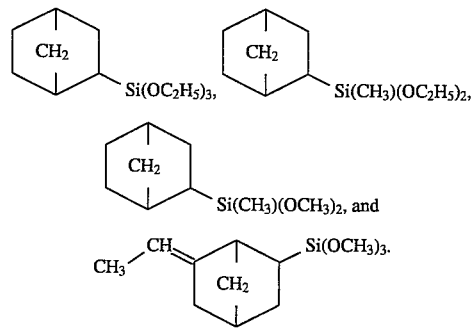

[Polymerization Process]

The polymerization process according to the present invention, in which polymerization is conducted in the presence of the above-described catalytic components, comprises at least two steps, the preceding polymerization step and the succeeding polymerization step.

<Preparation of Catalyst>

The catalyst for use in the present invention can be prepared by contacting with one another the above-described catalytic components (A) and (B), and, if necessary, the optional component (D) at a time or by stages in or out of the polymerization system.

<Preceding Polymerization Step>

The preceding polymerization step is a process in which propylene, or a mixture of propylene and ethylene, is supplied to the polymerization system containing the above-described catalytic components (A) and (B), and, if necessary, the optional component (D), and polymerized in a single stage or multiple stages, whereby a homopolymer of propylene, or a propylene-ethylene copolymer containing 7 wt. % or less, preferably 4 wt. % or less, and more preferably 0.5 wt. % or less of ethylene is produced in an amount of 30 to 95 wt. %, preferably 50 to 90 wt. %, of the total amount of polymers obtained.

In the case where the ethylene content in the copolymer of propylene and ethylene obtained at the preceding polymerization step is in excess of 7 wt. %, the finally obtainable copolymer has a decreased bulk density, and a low crystalline polymer is produced as a by-product in a largely increased amount. Further, when the polymerization ratio is less than the lower limit of the above-described range, the amount of a low crystalline polymer produced as the by-product is increased. On the other hand, when the polymerization ratio exceeds the upper limit of the above range, the aimed effect of the invention, that is, the improvement in the impact resistance of the block copolymer produced may not be attained.

The polymerization temperature at the preceding polymerization step is approximately 30 to 95° C., preferably 50° to 85° C. The polymerization pressure is, in general, in the range of from 1 to 50 kg/cm$^2$G. At the preceding polymerization step, it is preferable to control the MFR by using a molecular weight regulator such as hydrogen to enhance the fluidity of the final copolymer at the time of fusion.

<Addition of Component (C)>

The component (C) is added at the succeeding polymerization step. The addition may be substantially conducted at the succeeding polymerization step, so that the component (C) can be added before or during the succeeding polymerization step, or during the preceding polymerization step. The preferable timing of the addition is after the completion of the preceding polymerization step, or at the beginning of the succeeding polymerization step.

<Succeeding Polymerization Step>

The succeeding polymerization step is a process in which the polymerization is successively conducted after the preceding polymerization, that is, by utilizing at least part of the polymerization activity at the preceding polymerization step, and by further feeding ethylene or a mixture of propylene and ethylene, a copolymer of propylene and ethylene is produced, in a single stage or multiple stages, with the polymerization ratio in weight ratio of propylene to ethylene of 0/100 to 90/10, preferably 0/100 to 80/20, that is, a copolymer (produced at this succeeding polymerization step) with the ethylene content of 10 to 100 wt. %, preferably 20 to 100 wt. %, more preferably 30 to 100 wt. %, and still more preferably 30 to 70 wt. %. At this step, it is preferable to produce the polymer in the succeeding step in an amount of 5 to 70 wt. %, preferably 10 to 50 wt. %, of the total polymerization amount.

At the succeeding polymerization step, other comonomers can additionally be used. For instance, an α-olefin such as 1-butene, 1-pentene and 1-hexene can be employed.

The polymerization temperature at the succeeding polymerization step is approximately 30° to 90° C., preferably 50° to 80° C. The polymerization pressure is, in general, in the range of 1 to 50 kg/cm$^2$G.

When shifting from the preceding polymerization step to the succeeding polymerization step, it is preferable to purge propylene gas or propylene/ethylene mixed gas and hydrogen gas remaining.

At the succeeding polymerization step, a molecular weight regulator may be used or may not be used depending upon the purpose.

<Polymerization Mode>

The process for preparing the copolymer according to the present invention can be put into practice by any one of a batch method, a continuous method and a semi-batch method. To prepare the copolymer by the above method, any one of the following modes is employable: a mode in which polymerization is conducted in an inert hydrocarbon solvent such as heptane, a mode in which polymerization is conducted by utilizing monomers employed as the medium, a mode in which polymerization is conducted in gaseous monomers without employing a medium, and a mode in which polymerization is conducted in combination with the above modes.

It is also acceptable to subject the solid catalyst, before it is used in the polymerization, to a preliminary polymerization step under the conditions milder than the predetermined conditions for the polymerization (see the official gazettes of Japanese Laid-Open Patent Applications No. 55-71712 and No. 56-57814).

[EXAMPLES OF EXPERIMENTS] Example 1

[Preparation of Component (A)]

To a flask thoroughly purged with nitrogen were introduced 200 ml of dehydrated and deoxygenated n-heptane, and then 0.4 mol of MgCl$_2$ and 0.8 mol of Ti(O-nC$_4$H$_9$)$_4$, followed by a reaction at 95° C. for two hours. After the reaction was completed, the reaction mixture was cooled to a temperature of 40° C. and then 48 ml of methylhydrogenpolysiloxane having a viscosity of 20 centistokes was added thereto, followed by a reaction for three hours. The solid component thus obtained was washed with n-heptane.

Subsequently, 50 ml of n-heptane which had been purified in the same way as the above was introduced into a flask thoroughly purged with nitrogen, and then 0.24 mol, calculated in terms of the Mg element, of the above-synthesized solid component was introduced thereto. Thereafter, a mixture of 25 ml of n-heptane and 0.4 mol of SiCl$_4$ was introduced into the flask at 30° C. over 30 minutes, followed by a reaction at 70° C. for three hours. After the reaction was completed, the reaction product was washed with n-heptane. Subsequently, a mixture of 25 ml of n-heptane and 0.024 mol of phthalic acid chloride was introduced into the flask at 70° C. over 30 minutes, followed by a reaction at 90° C. for one hour.

After completion of the reaction, the reaction product was washed with n-heptane, and then 20 ml of SiCl$_4$ was introduced, followed by a reaction at 80° C. for six hours. After the reaction was completed, the reaction product was thoroughly washed with n-heptane. It was found that the product contained 1.21 wt. % of titanium.

50 ml of n-heptane thoroughly purified was introduced to a flask thoroughly purged with nitrogen, and then 5 g of the above-obtained component, 0.8 ml of (CH$_3$)CSi(CH$_3$)(OCH$_3$)$_2$, 0.5 g of WCl$_6$, and 2.0 g of triethylaluminum were introduced thereto, in the order named, and were contacted with one another at 30° C. for two hours. After completion of the contact, the product was washed with n-heptane to give component (A). The titanium content in the component (A) was 1.02 wt. %.

[Copolymerization of Propylene]

After thorough purge of a 1.5-liter agitator-equipped autoclave with propylene, 500 ml of thoroughly dehydrated and deoxygenated n-heptane was introduced to it, and then 17 mg of the above catalytic component (A) and 125 mg of triethylaluminum (component (B)) were introduced thereto under a propylene atmosphere.

After introducing 200 ml of hydrogen, the temperature was elevated to 75° C. and propylene was introduced at a constant rate of 0.917 g/min. After three hours, the introduction of the propylene was terminated, and the polymerization was continued at 75° C. When the pressure reached to 2 kg/cm$^2$G, 1/10 of the reaction mixture was taken out as an intermediate sample. The gas phase was then purged so that the pressure was reduced to 0.2 kg/cm$^2$G. 10 mg (30 times the amount of titanium contained in the component (A) on molar basis) of vinyltrimethylsilane was then added. Thereafter, propylene was introduced at a constant rate of 0.133 g/min, and ethylene was introduced at a constant rate of 0.200 g/min at 65° C. over 1.5 hours.

After the polymerization reaction was completed, the gas phase was purged, and the slurry was subjected to filtration, followed by drying to give 165.5 g of a polymer. By drying the filtrate, 1.59 g of a low crystalline polymer was obtained as a by-product. The MFR of the polymer thus obtained was 9.65 g/10 min, and the bulk density was 0.485 g/cc. Further, the MFR of a polymer obtained by drying the intermediate sample was 18.7 g/10 min. The angle of repose of the polymer powder obtained was 30.0 degrees. The yield in this polymerization was 10,800 g polymer/g-solid catalyst.

Example 2

Polymerization was conducted under the same conditions as in Example 1 except that the amount of the vinyltrimethylsilane used at the succeeding step of the copolymerization of propylene in Example 1 was changed to 5 mg (15 times the amount of titanium contained in the component (A) on molar basis). The results are shown in Table 1.

Comparative Example 1

Polymerization was conducted without using the vinyltrimethylsilane which was employed at the succeeding step of copolymerization of propylene in Example 1. The results are shown in Table 1.

Example 3

[Preparation of Component (A)]

To a flask thoroughly purged with nitrogen were introduced 200 ml of dehydrated and deoxygenated n-heptane, and then 0.4 mol of MgCl$_2$ and 0.8 mol of Ti(O-nC$_4$H$_9$)$_4$, followed by a reaction at 95° C. for two hours. After the reaction was completed, the reaction mixture was cooled to a temperature of 40° C., and then 48 ml of methylhydrogenpolysiloxane having a viscosity of 20 centistokes was added thereto, followed by a reaction for three hours. The solid component thus obtained was washed with n-heptane.

Subsequently, 50 ml of n-heptane which had been purified in the same way as the above was introduced into a flask thoroughly purged with nitrogen, and then 0.24 mol, calculated in terms of the Mg element, of the above-synthesized solid component was introduced thereto. Thereafter, a mixture of 25 ml of n-heptane and 0.4 mol of SiCl$_4$ was introduced into the flask at 30° C. over 30 minutes, followed by a reaction at 70° C. for three hours. After the reaction was completed, the reaction product was washed with n-heptane.

Subsequently, a mixture prepared by dissolving 0.55 g of diphenylmethanol in 25 ml of toluene was introduced into the flask at 50° C. over 30 minutes, followed by a reaction at 90° C. for three hours. After completion of the reaction, the reaction product was washed with n-heptane, and then 25 ml of TiCl$_4$ was added, followed by a reaction at 90° C. for two hours. After removing a supernatant liquid, 25 ml of TiCl$_4$ was further added to the reaction mixture, followed by a reaction at 90° C. for two hours. After the reaction was completed, the reaction product was washed with n-heptane. After the washing, 0.14 ml (1 mM) of ethylcellosolve acetate

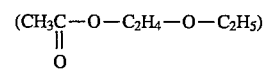

was added, followed by a reaction at 90° C. for two hours. After completion of the reaction, the reaction product was washed with n-heptane to give component (A). The titanium content in the component (A) was 3.24 wt. %.

[Copolymerization of Propylene]

Polymerization was conducted under the same conditions as in Example 1 except that 20 mg of the above-obtained component (A), 125 mg of triethylaluminum as the component (B), 53.6 mg of diphenyldimethoxysilane as the optional component (D) (optional component (D)/component (B)=0.2 (molar ratio)), and 40 ml of vinyltrimethylsilane as the component (C) (30 times the amount of titanium contained in the component (A) on molar basis) were employed. The results are shown in Table 1.

Examples 4 to 8 and Comparative Examples 2 and 3

Polymerizations were conducted under the same conditions as in Example 1 except that the compounds shown in Table 2 were respectively used, in the predetermined amounts, as the component (C) instead of the vinyltrimethylsilane. The results are shown in Table 2.

In these tables, the estimated MFR of the EPR portion was obtained in accordance with the following equation:

Estimated $MFR$ of $EPR =$ $$\exp = \left( \frac{A \ln(MFR - P) - a_1 \ln(MFR - 1)}{a_2} \right)$$

wherein A represents the amount of the polymer finally produced, $a_1$ represents the polymerization amount at the preceding polymerization step (estimated from the amount of monomers fed, the amount of solvent dissolved and the amount of gas phase remaining), $a_2$ represents the polymerization amount (estimated) at the succeeding polymerization step, MFR-P represents the MFR of the polymer finally produced, and MFR-1 represents the MFR of the intermediate sample obtained after completion of the preceding polymerization.

TABLE 1

| | Component (A) (mg) | Component (B) Triethyl-aluminum (mg) | Component (C) Vinyl-trimethyl silane (mg) | Polymerization activity* (g PP/g Component (A)) | MFR (g/10 min) Preceding step/total polymer | MFR (g/10 min) EPR portion estimated | By-product low crystalline polymer (wt. %) | Bulk density (g/cc) | Angle of Repose (degrees) | Remarks |
|---|---|---|---|---|---|---|---|---|---|---|
| Example 1 | 17 | 125 | 10 | 10,800 | 18.7/9.65 | 0.299 | 0.96 | 0.485 | 30.0 | |
| Example 2 | 17 | 125 | 5 | 10,400 | 19.5/9.30 | 0.150 | 1.20 | 0.487 | 31.0 | |
| Comparative Example 1 | 17 | 125 | — | 10,700 | 19.0/10.0 | 0.295 | 5.56 | 0.312 | 50.6 | sticky (dough-like) |
| Example 3 | 20 | 125 | 40 | 9,000 | 18.3/9.10 | 0.189 | 1.01 | 0.501 | 29.0 | 53.6 mg of diphenyl-dimethoxy-silane used (optional component (D)) |

*PP: polypropylene

TABLE 2

| | Component (C) | Amount used (molar ratio to titanium) | Polymerization activity (g PP/g Component (A)) | MFR (g/10 min) Preceding step/total polymer | MFR (g/10 min) EPR portion estimated | By-product low crystalline polymer (wt. %) | Bulk density (g/cc) | Angle of Repose (degrees) | Remarks |
|---|---|---|---|---|---|---|---|---|---|
| Example 4 | Vinyldimethyl-chlorosilane | 10 | 10,100 | 19.5/10.1 | 0.296 | 1.10 | 0.495 | 30.0 | |
| Example 5 | Vinyldimethyl-siloxane | 5 | 10,000 | 19.1/9.8 | 0.219 | 1.30 | 0.493 | 31.0 | |
| Example 6 | Norbornene | 30 | 11,000 | 18.6/9.6 | 0.251 | 1.44 | 0.485 | 32.0 | |
| Example 7 | Vinyl butyl ether | 1 | 10,500 | 19.0/9.15 | 0.157 | 0.90 | 0.505 | 29.0 | |
| Example 8 | Methyl methacrylate | 1 | 10,100 | 20.1/8.85 | 0.088 | 1.10 | 0.490 | 32.0 | |
| Comparative Example 2 | Allyltrimethyl-silane | 10 | 10,300 | 19.5/9.8 | 0.255 | 4.68 | 0.352 | 46.6 | |
| Comparative Example 3 | Acetone | 40 | 10,300 | 19.0/7.23 | 0.029 | 2.05 | 0.488 | 32.0 | |

What is claimed is:

1. A process for preparing propylene block copolymers consisting essentially of:

a preceding polymerization step in which a crystalline homopolymer of propylene, or a propylene-ethylene copolymer containing 7 wt. % or less of ethylene copolymerized is produced in the presence of a catalyst consisting of the following components (A) and (B), and a succeeding polymerization step in which the polymerization is continued in the presence of at least a part of the product obtained from the preceding polymerization step, and in the presence of the following component (C) which is added after the completion of the preceding polymerization step to give the propylene block copolymer with a polymerization ratio in a weight ratio of propylene to ethylene of from 0/100 to 90/10;

the polymerization amount at the preceding polymerization step being from 30 to 95 wt. % of the total polymerization amount at said preceding and succeeding polymerization steps;

component (A): essentially a solid catalyst component of Ziegler catalysts consisting essentially of titanium, magnesium, a halogen and an electron donor selected from the group consisting of esters of an organic acid, acid halides, organoalkoxysilicons and esters of an inorganic acid:

component (B): an organoaluminum compound;

component (C): a compound selected from the group consisting of a cyclic olefin having 5 to 12 carbon atoms, vinyl tri-lower alkyl silane, a vinyl lower alkyl ether and methyl methacrylate, the weight ratio of the component (B) to the component (A) being from 1 to 100 and the molar ratio of the component (C) to the titanium contained in the component (A) being from 0.2 to 100.

2. A process according to claim 1, wherein the polymerization amount at said preceding polymerization step is from 50 to 90 wt. % of the total polymerization amount at said preceding and succeeding polymerization steps.

3. A process according to claim 1, wherein said polymerization ratio in a weight ratio of propylene to ethylene at said succeeding polymerization step is from 0/100 to 80/20.

4. A process according to claim 1, wherein said polymerization ratio in a weight ratio of propylene to ethylene at said succeeding polymerization step is from 0/100 to 70/30.

5. A process according to claim 4, wherein said polymerization ratio in a weight ratio of propylene to ethylene at said succeeding polymerization step is from 30/70 to 70/30.

6. A process according to claim 1, wherein said component (A) is prepared by a method selected from the group consisting of:

(a) a method in which a halogenated magnesium and an electron donor are brought into contact with a titanium-containing compound;

(b) a method in which halogenated magnesium, and electron donor and halogen-containing titanium compound are brought into contact with alumina or magnesia which has been treated with a halogenated phosphorus compound;

(c) a method in which a halogenated titanium compound and/or a halogenated compound of silicon and, as an optional component, an electron donor are brought into contact with a solid component which is obtained by contacting halogenated magnesium with a titanium tetraalkoxide and a polymeric silicon compound having the following formula:

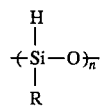

wherein R is a hydrocarbyl group having approximately 1 to 10 carbon atoms, and n represents such a polymerization degree that the polymeric silicon compound has a viscosity of approximately 1 to 100 centistokes;

(d) a method in which a titanium compound is brought into contact with a solid component which is separated, by using a halogenating agent or titanium halogen compound, from a solution prepared by dissolving a magnesium compound in a titanium tetraalkoxide and an electron donor;

(e) a method in which an organomagnesium compound is reacted with a halogenating agent and/or a reducing agent and then an electron donor and a titanium compound are brought into contact therewith; and (f) a method in which a halogenating agent and/or titanium compound is brought into contact with an alkoxymagnesium compound in the presence or absence of an electron donor.

7. A process according to claim 1, wherein said component (B) is an organoaluminum compound selected from the group consisting of (i) compounds represented by the formula $R^2_{3-n}AlX_n$, and (ii) compounds represented by the formula $R^3_{3-m}Al(OR^4)_m$, in both formulae $R^2$ and $R^3$ which may be the same or different, are hydrocarbyl groups each having 1 to 20 carbon atoms or a hydrogen atom, $R^4$ is a hydrocarbyl group, X is a halogen, and n and m are numbers in the ranges of $0 \leq n < 3$ and $0 < m < 3$, respectively.

8. A process according to claim 1, wherein the amount of said component (C) used is such that the molar ratio of said component (C) to said titanium comprised in said component (A) is from 0.5 to 100.

9. A process for preparing propylene block copolymers consisting essentially of:

a preceding polymerization step in which a crystalline homopolymer of propylene, or a propylene-ethylene copolymer containing 7 wt. % or less of ethylene copolymerized is produced in the presence of a catalyst consisting of the following components (A), (B) and (D), and a succeeding polymerization step in which the polymerization is continued in the presence of at least part of the product obtained from the preceding polymerization step, and in the presence of the following component (C), which is added after the completion of the preceding polymerization step to give the propylene block copolymer with a polymerization ratio in a weight ratio of propylene to ethylene of from 0/100 to 90/10;

the polymerization amount at the preceding polymerization step being from 30 to 95 wt. % of the total polymerization amount at said preceding and succeeding polymerization steps;

component (A): a solid catalyst component of Ziegler catalysts consisting essentially of titanium, magnesium, a halogen and an electron donor selected from the group consisting of esters of an organic acid, acid halides organoalkoxysilicons and esters of an inorganic acid;

component (B): an organoaluminum compound;

component (C): a compound selected from the group consisting of a cyclic olefin having 5 to 12 carbon atoms, vinyl tri-lower alkyl silane, a vinyl lower alkyl ether and methyl methacrylate, component (D): an electron donor compound which is a silicon compound represented by a formula:

in which $R^1$ and $R^2$ are hydrocarbyl groups each having 1 to 20 carbon atoms, X is a halogen, and m and n are numbers which are in the ranges $0 \leq m \leq 3$ and $0 \leq n \leq 3$, and at the same time fulfill the relationship of $0 \leq m+n \leq 3$;

the weight ratio of the component (B) to the component (A) being from 1 to 100 and the molar ratio of the component (C) to the titanium contained in the component (A) being from 0.2 to 100.

10. A process according to claim 9, wherein said component (D) is a silicon compound represented by the following formula:

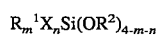

wherein $R^1$ and $R^2$ are hydrocarbyl groups having 1 to 10 carbon atoms, X is halogen, and m and n are numbers which are in the ranges of $0 \leq m \leq 3$ and $0 \leq n \leq 3$, respectively, and, at the same time, fulfill the relation of $0 \leq m+n \leq 3$.

11. A process according to claim 1, wherein the amount of the electron donor in component (A) is in the range of from $1 \times 10^{-3}$ to 10 in terms of a molar ratio of the electron donor to the magnesium compound used for providing the magnesium.

12. A process according to claim 9, wherein the polymerization amount at said preceding polymerization step is from 50 to 90 wt. % of the total polymerization amount at said preceding and succeeding polymerization steps.

13. A process according to claim 9, wherein said polymerization ratio in a weight ratio of propylene to ethylene at said succeeding polymerization step is from 0/100 to 80/20.

14. A process according to claim 9 wherein said polymerization ratio in a weight ratio of propylene to ethylene at said succeeding polymerization step is from 0/100 to 70/30.

15. A process according to claim 9, wherein said polymerization ratio in a weight ratio of propylene to ethylene at said succeeding polymerization step is from 30/70 to 70/30.

16. A process according to claim 9, wherein said component (A) is prepared by a method selected from the group consisting of:

(i) a method in which a halogenated titanium compound and/or a halogenated compound of silicon and, as an optional component, an electron donor are brought into contact with a solid component which is obtained by contacting halogenated magnesium with a titanium tetraalkoxide and a polymeric silicon compound having the following formula:

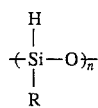

wherein R is a hydrocarbyl group having approximately 1 to 10 carbon atoms, and n represents such a polymerization degree that the polymeric silicon compound has a viscosity of approximately 1 to 100 centistokes;

(ii) a method in which a titanium compound is brought into contact with a solid component which is separated, by using a halogenating agent or titanium halogen compound, from a solution prepared by dissolving a magnesium compound in a titanium tetraalkoxide and an electron donor; and (iii) a method in which an organomagnesium compound is reacted with a halogenating agent and/or a reducing agent and then an electron donor and a titanium compound are brought into contact therewith.

17. A process according to claim 16, wherein said component (A) is prepared by said method (c).

18. A process according to claim 9, wherein said component (B) is an organoaluminum compound selected from the group consisting of (i) compounds represented by the formula $R^2_{3-n}AlX_n$, and (ii) compounds represented by the formula $R^3_{3-m}Al(OR^4)_m$, in both formulae $R^2$ and $R^3$ which may be the same or different, are hydrocarbyl groups each having 1 to 20 carbon atoms or a hydrogen atom, $R^4$ is a hydrocarbyl group, X is a halogen, and n and m are numbers in the ranges of $0 \leq n \leq 3$ and $0 < m < 3$, respectively.

19. A process according to claim 9, wherein the amount of said component (C) used is such that the molar ratio of said component (C) to said titanium comprised in said component (A) is from 0.5 to 100.

20. A process as claimed in claims 1 or 9, wherein the electron donor in said component (A) is at least one selected from the group consisting of esters of an organic acid having 2 to 20 carbon atoms, acid halides having 2 to 15 carbon atoms, and organoalkoxysilicones.

21. A process as claimed in claims 1 or 9, wherein the component (A) is such that the molar ratio of the titanium component to the magnesium component employed is in the range of 0.01 to 10 and the molar ratio of the electron donor to the magnesium component employed is in the range of from 0.01 to 5.

22. A process according to claim 1, wherein said component (A) is prepared by a method selected from the group consisting of:

(i) a method in which a halogenated titanium compound and/or a halogenated compound of silicon and, as an optional component, an electron donor are brought into contact with a solid component which is obtained by contacting halogenated magnesium with a titanium tetraalkoxide and a polymeric silicon compound having the following formula:

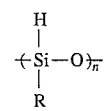

wherein R is a hydrocarbyl group having approximately 1 to 10 carbon atoms, and n represents such a polymerization degree that the polymeric silicon compound has a viscosity of approximately 1 to 100 centistokes;

(ii) a method in which a titanium compound is brought into contact with a solid component which is separated, by using a halogenating agent or titanium halogen compound, from a solution prepared by dissolving a magnesium compound in a titanium tetraalkoxide and an electron donor; and (iii) a method in which an organomagnesium compound is reacted with a halogenating agent and/or a reducing agent and then an electron donor and a titanium compound are brought into contact therewith.

23. A process according to claim 1, wherein said component (A) is prepared by the following method:

(i) a method in which a halogenated titanium compound and/or a halogenated compound of silicon and, as an optional component, an electron donor are brought into contact with a solid component which is obtained by contacting halogenated magnesium with a titanium tetraalkoxide and a polymeric silicon compound having the following formula:

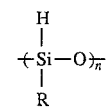

wherein R is a hydrocarbyl group having approximately 1 to 10 carbon atoms, and n represents such a polymerization degree that the polymeric silicon compound has a viscosity of approximately 1 to 100 centistokes.

24. A process according to claim 1, wherein said component (C) is vinyltrimethylsilane, a vinyl lower alkyl ether or methyl methacrylate.

25. A process according to claim 1, wherein said component (C) is vinyltrimethylsilane or a vinyl lower alkyl ether.

26. A process according to claim 9, wherein said component (C) is vinyltrimethylsilane, a vinyl lower alkyl ether or methyl methacrylate.

27. A process according to claim 9, wherein said component (C) is vinyltrimethylsilane or a vinyl lower alkyl ether.

* * * * *